US012677961B1

(12) United States Patent
Xu

(10) Patent No.: US 12,677,961 B1
(45) Date of Patent: Jul. 14, 2026

(54) PORTABLE CHILD SEAT ASSEMBLY

(71) Applicant: Zhiming Xu, Zhejiang (CN)

(72) Inventor: Zhiming Xu, Zhejiang (CN)

( * ) Notice: Subject to any disclaimer, the term of this patent is extended or adjusted under 35 U.S.C. 154(b) by 0 days.

(21) Appl. No.: 19/439,404

(22) Filed: Jan. 4, 2026

(51) Int. Cl.
| | |
|---|---|
| *A47D 1/00* | (2006.01) |
| *A47D 1/02* | (2006.01) |
| *A47D 1/10* | (2006.01) |
| *A47D 15/00* | (2006.01) |
| *B60N 2/28* | (2006.01) |
| *B62B 3/14* | (2006.01) |

(52) U.S. Cl.
CPC .............. *A47D 1/006* (2013.01); *A47D 1/02* (2013.01); *A47D 1/10* (2013.01); *A47D 15/006* (2013.01); *B60N 2/28* (2013.01); *B62B 3/144* (2013.01); *B62B 3/1448* (2013.01); *B62B 3/1452* (2013.01)

(58) Field of Classification Search
CPC ..... B62B 3/144; B62B 3/1452; B62B 3/1448; B62B 5/08; B62B 5/082; A47D 1/02; A47D 1/006; A47D 1/10; A47D 15/006; B60N 2/28
USPC ...................................... 297/256.17
See application file for complete search history.

(56) References Cited

U.S. PATENT DOCUMENTS

| | | | | | |
|---|---|---|---|---|---|
| 2,477,164 | A | * | 7/1949 | Bergman | A47D 13/025 224/159 |
| 2,496,216 | A | * | 1/1950 | Kaminski | A47D 13/025 224/159 |

| | | | | | |
|---|---|---|---|---|---|
| 3,992,056 | A | * | 11/1976 | Koziatek | B60N 2/2812 D6/333 |
| 4,204,695 | A | * | 5/1980 | Salzman | B62B 3/144 280/33.993 |
| 4,382,595 | A | * | 5/1983 | Tolar | A63G 9/00 297/275 |
| 4,759,086 | A | * | 7/1988 | Booth-Cox | A61G 5/1002 4/451 |
| 4,854,638 | A | * | 8/1989 | Marcus | A47D 1/103 297/DIG. 2 |
| 4,889,388 | A | * | 12/1989 | Hime | A47C 7/425 297/464 |
| D316,135 | S | * | 4/1991 | Barber, Jr. | D6/333 |
| 5,123,699 | A | * | 6/1992 | Warburton | A61G 5/1048 297/223 |
| 5,238,293 | A | * | 8/1993 | Gibson | B62B 3/144 297/229 |
| 5,330,250 | A | * | 7/1994 | Reyes | B62B 3/144 297/229 |

(Continued)

FOREIGN PATENT DOCUMENTS

WO     WO-2018199765 A1 * 11/2018     ............. A47D 1/103

*Primary Examiner* — Robert Canfield
(74) *Attorney, Agent, or Firm* — Hawaii Patent Services; Nathaniel K. Fedde; Kenton N. Fedde

(57)     ABSTRACT

The present disclosure relates to a portable child seat assembly, comprising a main frame formed by a soft-covered backrest, seat plate, lateral plates, and a front baffle, which defines a leg opening, and further comprising a connecting assembly with a plurality of connecting belts for detachably securing to an external bearing structure such as a shopping cart or swing; the assembly is further provided with an adjustable protective assembly fixed at both ends to the backrest, used to constrain the child across the seating space. This assembly addresses issues of public child seats being hard and uncomfortable, having poor safety, and inconvenient installation, offering comfort, safety, multi-scenario adaptability, and portability.

19 Claims, 14 Drawing Sheets

(56)  References Cited

U.S. PATENT DOCUMENTS

| | | | | | |
|---|---|---|---|---|---|
| 5,482,352 | A | * | 1/1996 | Leal | B60N 2/286 |
| | | | | | 297/219.12 |
| 5,641,200 | A | * | 6/1997 | Howell | B62B 3/144 |
| | | | | | 280/33.993 |
| 6,007,572 | A | * | 12/1999 | Baldwin | A61F 7/02 |
| | | | | | 297/380 |
| 6,517,155 | B1 | * | 2/2003 | Landine | B62B 3/144 |
| | | | | | 280/33.993 |
| 6,848,743 | B1 | * | 2/2005 | Collins | B62B 3/144 |
| | | | | | 297/229 |
| 10,314,375 | B2 | * | 6/2019 | Ciraolo | A47D 1/10 |
| 10,351,153 | B2 | * | 7/2019 | Lopez | B62B 3/1444 |
| 10,588,423 | B1 | * | 3/2020 | Adkins | A47D 15/006 |
| 11,547,220 | B1 | * | 1/2023 | Pogue | B62B 3/1444 |
| 2002/0167214 | A1 | * | 11/2002 | Nelson | A47D 15/003 |
| | | | | | 297/250.1 |
| 2008/0036256 | A1 | * | 2/2008 | Gold | A47D 1/02 |
| | | | | | 297/440.1 |
| 2010/0032460 | A1 | * | 2/2010 | Hyde | A47D 15/006 |
| | | | | | 224/160 |
| 2013/0270882 | A1 | * | 10/2013 | Mills | A47D 15/00 |
| | | | | | 297/219.12 |
| 2020/0046140 | A1 | * | 2/2020 | Pankratz | A47D 1/10 |
| 2020/0060433 | A1 | * | 2/2020 | Reid | A47D 1/103 |
| 2025/0145295 | A1 | * | 5/2025 | Milks | B64D 11/0612 |
| 2025/0386939 | A1 | * | 12/2025 | Liang | A47C 4/54 |

* cited by examiner

PORTABLE CHILD SEAT ASSEMBLY

TECHNICAL FIELD

The present disclosure relates to the technical field of child seat accessories, particularly to a portable child seat assembly.

BACKGROUND

In various public places such as supermarkets, restaurants, and play areas, public facilities with child seats are often provided for the convenience of parents carrying infants and young children. Typical examples include supermarket shopping carts, restaurant high chairs, and outdoor swings. Currently, common child seats on the market mostly adopt simple metal mesh frames or one-piece molded hard plastic structures, which have fixed shapes and hard surfaces. In actual long-term use, several significant drawbacks have gradually emerged.

Firstly, such seats generally lack sufficient consideration for infant ergonomics, failing to provide effective support and envelopment that conforms to their physiological curves. As the bones and muscles of infants and young children are still developing, prolonged sitting on flat or simply curved hard seats can easily lead to discomfort, fatigue, and even poor posture, subsequently causing crying and resistance, which severely impacts the user experience and facility effectiveness.

Secondly, in terms of safety, existing seats also present obvious hazards. Metal or hard plastic components often have rough edges and connections with insufficient chamfering, which can easily scratch the delicate skin of infants; meanwhile, the assembly gaps between components vary in size, posing risks of pinching children's fingers, clothing, or body parts, constituting a potential threat to child safety.

SUMMARY

The present disclosure provides a portable child seat assembly to address the issues raised in the above background.

To achieve the above object, the present disclosure adopts the following technical solutions:

A portable child seat assembly includes a main frame, a connecting assembly and a protective assembly. The main frame is formed by interconnecting and enclosing a backrest, a seat plate, a left lateral plate, a right lateral plate, and a front baffle with soft covering layers to create a seating space for accommodating a child; the front baffle preferably includes a transverse baffle segment and a longitudinal baffle segment extending downward from its middle, providing front support while defining at least one leg opening for the child's legs to extend through. The connecting assembly includes a plurality of connecting belts set at separate positions on the main frame, including a first connecting belt at the top of the backrest, second left and right connecting assemblies adjacent to the backrest area on the lateral plates, and third left and right connecting belts in the front baffle area; these connecting belts are preferably VELCRO® (hook and loop fastener) straps, used to detachably secure the main frame to an external bearing structure. The protective assembly includes an adjustable safety belt, with both ends fixed to the backrest, spanning across the seating space to restrain the child within; this safety belt includes a connecting belt with a fixed segment and an adjustable segment, and a buckle assembly containing a male buckle and a female buckle, with the male buckle integrated with an adjustment buckle for adjusting the length of the safety belt.

The beneficial effects of the present disclosure compared to the prior art are as follows:

By adopting a soft-covered composite structure to form an enclosed seating space, it provides soft, conforming support for the child's body, effectively avoiding the coldness and discomfort of traditional hard seats, while the soft edges reduce the risk of bumps; utilizing connecting belts (such as VELCRO® (hook and loop fastener) straps) set at a plurality of points on the top, sides, and front of the frame allows flexible and secure fastening of the seat to diverse external bearing structures like shopping carts, swing ropes, or independent seats, enabling quick installation and removal with strong versatility; integrating an adjustable safety belt that spans the seating space, through a buckle design with an adjustment buckle, conveniently adapts to children of different sizes, forming effective restraint at their waist/abdomen or chest/abdomen, and together with the enclosed frame constitutes dual protection, significantly reducing the risk of accidental displacement or falling.

BRIEF DESCRIPTION OF DRAWINGS

The drawings, which form a part of this application, are provided to further illustrate the present disclosure; the illustrative embodiments and descriptions thereof are intended to explain the present disclosure and do not constitute an undue limitation thereof. In the drawings.

Figure 1:
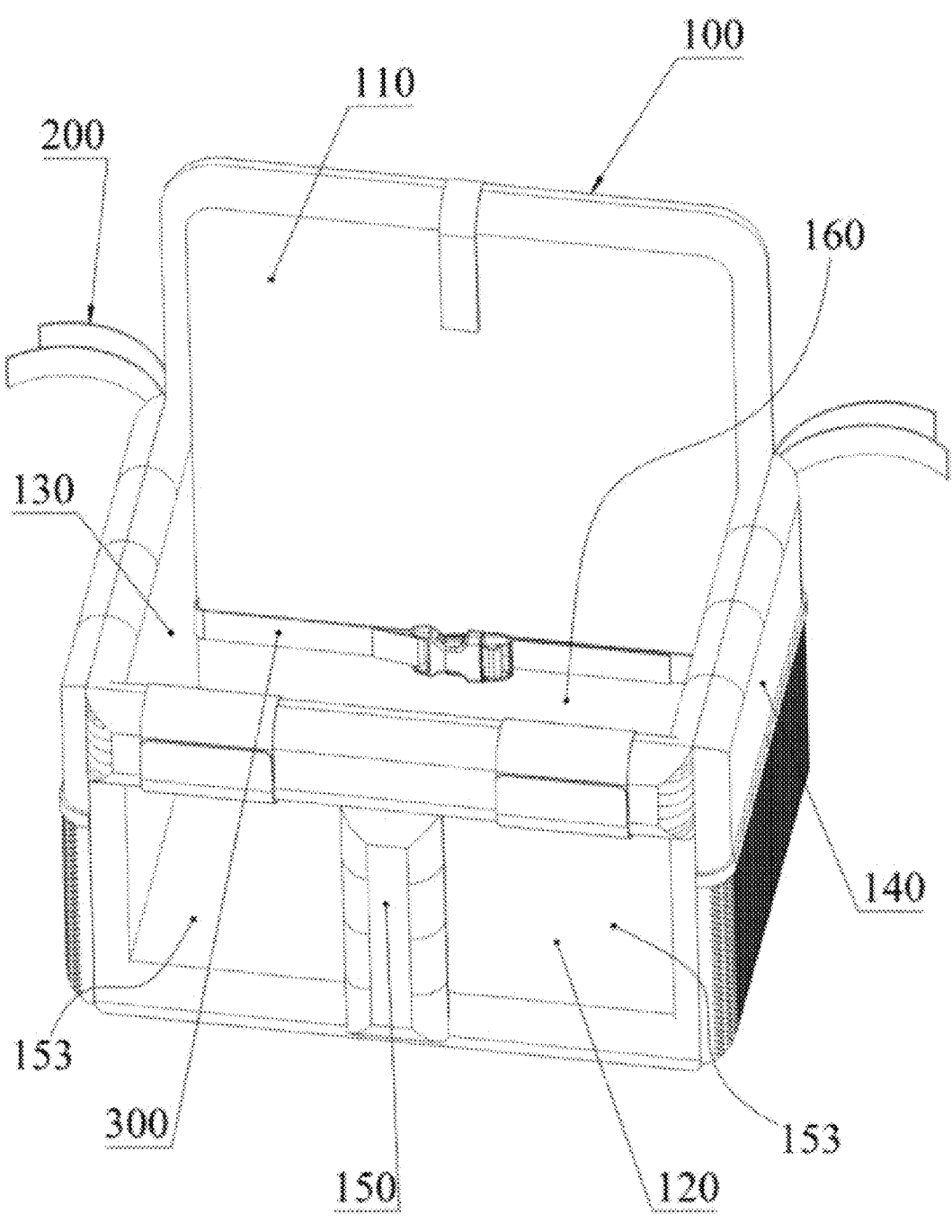
FIG. 1 is a perspective view of an embodiment provided by the present disclosure.

Reference signs: Main Frame (100), Backrest (110); Seat Plate (120); Left Lateral Plate (130); Right Lateral Plate (140); Front Baffle (150); Transverse Baffle Segment (151); Longitudinal Baffle Segment (152); Leg Opening (153); First Leg Opening (153a); Second Leg Opening (153b); Seating Space (160); Storage Assembly (170); Connecting Assembly (200); First Connecting Assembly (210); First Connecting Belt (211); Second Connecting Assembly (220); Second Left Connecting Assembly (221); First Sub-Belt (221*a*); Second Sub-Belt (221*b*); Second Right Connecting Assembly (222); Third Sub-Belt (222*a*); Fourth Sub-Belt (222*b*); Third Connecting Assembly (230); Third Left Connecting Assembly (231); Third Left Connecting Belt (2311); Third Right Connecting Assembly (232); Third Right Connecting Belt (2321); Protective Assembly (300); Connecting Belt (310); Fixed Segment (311); Adjustable Segment (312); Buckle Assembly (320); Male Buckle (321); Adjustment Buckle (3211); Female Buckle (322); First Restraining Belt (330); Second Restraining Belt (340); Third Restraining Belt (350); Fourth Restraining Belt (360); Fifth Restraining Belt (370); Cross Belt (400).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, equipment, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

In the present disclosure, addressing the technical issues of traditional public facility child seats (such as shopping cart seats, high chairs, swing seats) often employing rigid structures, lacking ergonomic support leading to child discomfort and fatigue, with rough edges and improper assembly gaps posing safety hazards like bumps and pinches, while having fixed forms without portable storage design or personal item storage functionality, a portable child seat assembly is provided. It includes an enclosed main frame (including panels such as a backrest, seat plate, lateral panels, etc.), a multi-dimensionally adaptable connecting assembly, and a protective assembly. The enclosed frame, combined with the adjustable protective assembly, addresses safety hazards, and the multi-dimensional connecting assembly enables adaptation to various installation scenarios, effectively resolving the technical shortcomings of existing child seats in terms of discomfort, a plurality of safety hazards, poor portability, and single functionality. Below, the specific embodiments of the portable child seat assembly of the present disclosure are described in detail with reference to the accompanying drawings.

As shown in FIG. 1, the present disclosure provides a portable child seat assembly, including a main frame 100, a connecting assembly 200, and a protective assembly 300. The main frame 100 includes a backrest 110, a seat plate 120, a left lateral plate 130, a right lateral plate 140, and a front baffle 150. The main frame 100 overall forms an enclosed frame structure, with each plate surface collectively defining a seating space 160 for carrying a child. Specifically, the backrest 110 is a substantially rectangular plate-like member, having an upper edge, a lower edge, and left and right side edges arranged opposite each other; the lower edge of the backrest 110 is adjacent to and connected with the rear edge of the seat plate 120, providing support for the child's back. The seat plate 120 is a plate-like bearing member, having a front edge, a rear edge, and left and right side edges, and is used to support the child's hips and thighs; the rear edge of the seat plate 120 is connected to the lower edge of the backrest 110, the left and right side edges of the seat plate 120 are respectively connected to the lower edges of the left lateral plate 130 and the right lateral plate 140, and the front edge of the seat plate 120 is connected to the lower edge of the front baffle 150, thereby forming an enclosed base above the seat plate 120.

Please also refer to FIGS. 1, 2, 3, and 4. The left lateral plate 130 and the right lateral plate 140 are located on the left and right sides of the seat plate 120 in the transverse direction X, respectively. They are basically symmetrical plate-shaped side enclosure components. The lower edge of the left lateral plate 130 is correspondingly connected to the left edge of the seat plate 120, and the lower edge of the right lateral plate 140 is correspondingly connected to the right edge of the seat plate 120, allowing both lateral plates to stand upright relative to the seat plate 120 to provide lateral limitation and protection for both sides of the child's torso. The left lateral plate 130 and the right lateral plate 140 each have a backrest side and a front baffle side. Their backrest sides are arranged adjacent to the corresponding side edges of the backrest 110 to reduce lateral openings. The front baffle 150 is set at the front side of the seat plate 120, preferably as a T-shaped front enclosure component. Its overall shape is formed by the cross-connection of a transverse baffle segment 151 and a longitudinal baffle segment 152 extending in the longitudinal direction Y perpendicular to the transverse baffle segment 151, creating a "T" shape. The transverse baffle segment 151 extends in the left-right direction, with its left and right ends correspondingly connected to the front edges of the left lateral plate 130 and the right lateral plate 140, respectively, to form the upper transverse limitation at the front edge of the seating space 160. The longitudinal baffle segment 152 extends in the up-down direction, with its upper end connected to the middle of the transverse baffle segment 151 and its lower end correspondingly connected to the middle of the front edge of the seat plate 120, providing longitudinal support and positioning in the middle of the front baffle 150. Based on the above structure, the front baffle 150, together with the seat plate 120, the left lateral plate 130, and the right lateral plate 140, encloses an opening 153 for the child's legs to extend through. The opening 153 is located on the left and right sides of the longitudinal baffle segment 152, preferably including left and right opposing first leg opening 153a and second leg opening 153b, allowing the child's two legs to extend through the corresponding leg openings, thereby reducing restraint on leg movement and enhancing seating comfort while ensuring front-side blocking and limitation.

Figure 2:
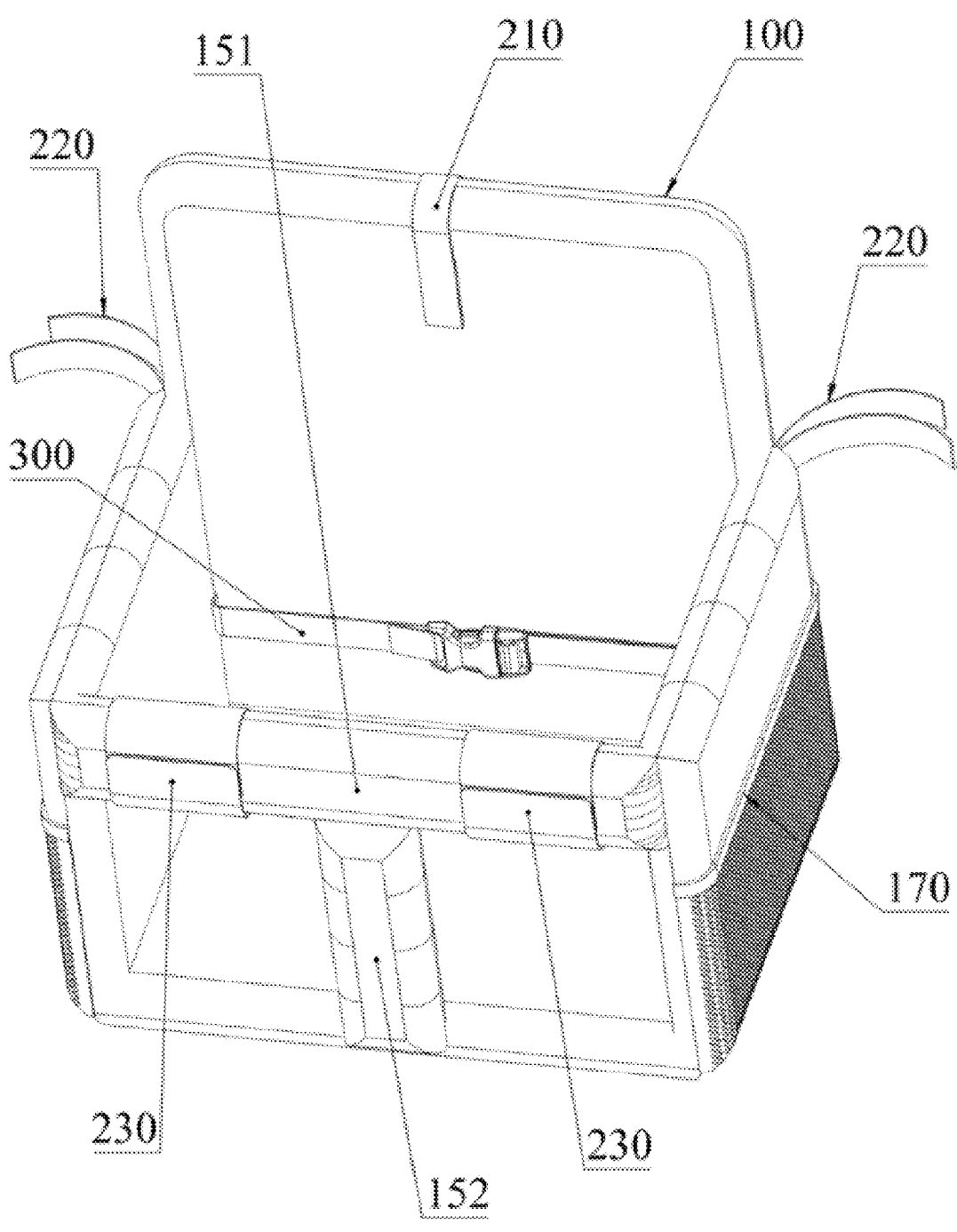
FIG. 2 is another perspective view of the embodiment in FIG. 1.
Figure 3:
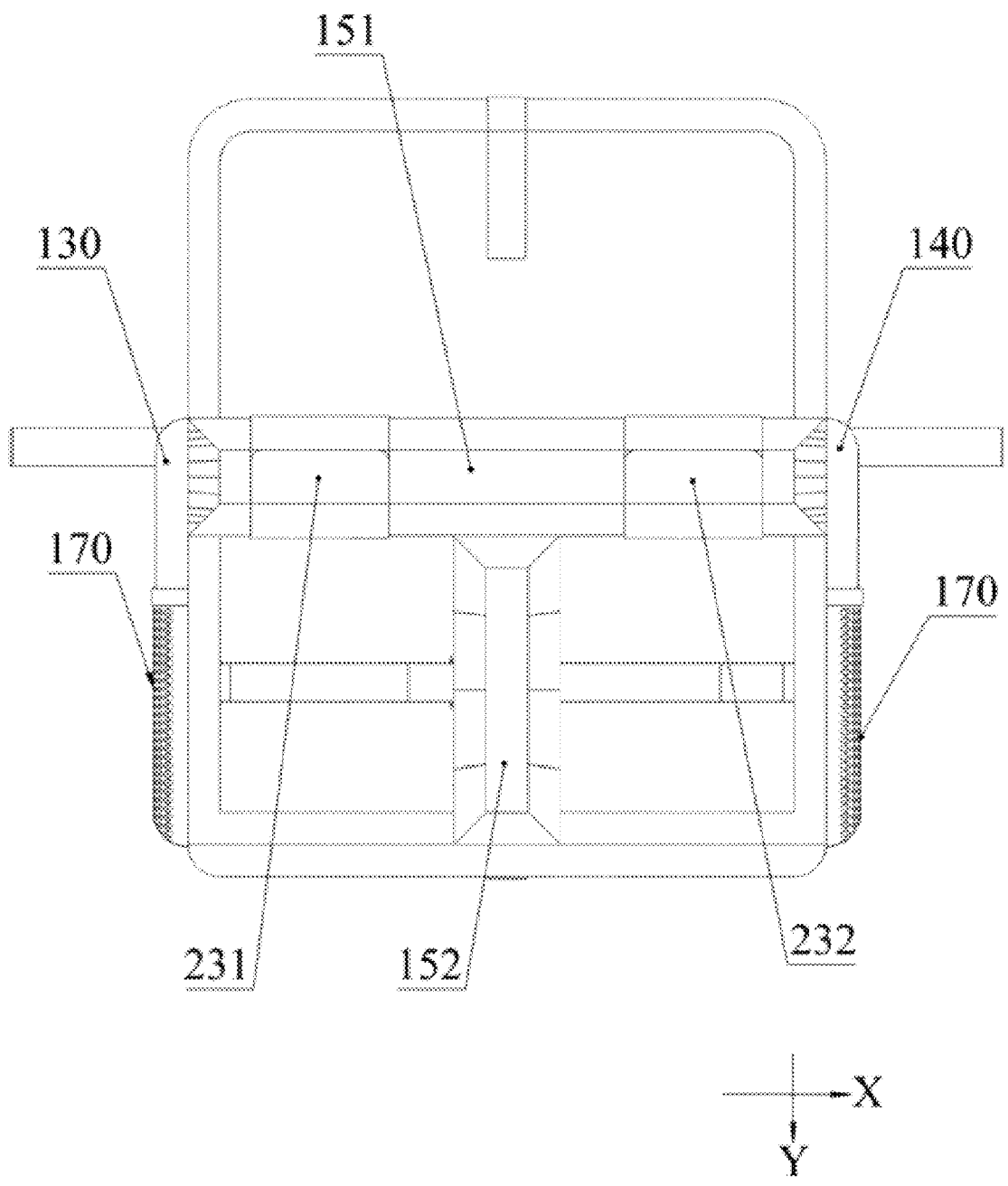
FIG. 3 is another perspective view of the embodiment shown in FIG. 1.

Please continue to refer to FIGS. 1, 2, and 3. The outer wall surfaces of the left lateral plate 130 and the right lateral plate 140 are also provided with a storage assembly 170 for placing personal items (such as tissues, wipes, bottles, cups, small toys, etc.) to enhance convenience of use. The storage assembly 170 preferably includes at least one receiving pocket. The receiving pocket is fixed along its circumferential edge to the outer wall surface of the corresponding lateral plate (by means such as stitching, heat pressing, bonding, or edge binding), thereby forming a pocket cavity between the receiving pocket and the outer wall surface of the lateral plate for accommodating items. The upper side of the receiving pocket forms an access opening for loading or removing items. The receiving pocket can be made of mesh fabric, netting, or wear-resistant fabric, making the items inside visible and breathable. The edges of the receiving pocket can also be equipped with reinforcement straps or thickened edging to improve load-bearing strength and durability.

In the present disclosure, preferably, the backrest 110, the seat plate 120, the left lateral plate 130, the right lateral plate 140 and the front baffle 150 can all adopt a soft-covered composite structure, including a cushioning filling layer (such as foam material or cotton layer) and an outer covering layer (such as fabric or leather material) stacked in sequence. The peripheral edges of each panel can be provided with edge binding tape, corner protectors, or thickened borders to improve contact comfort and reduce the risk of impact. Thus, the backrest 110, seat plate 120, the left lateral plate 130, the right lateral plate 140 and the front baffle 150 together enclose to form a seating space 160: the bottom of the seating space 160 is defined by the seat plate 120, its rear side is defined by the backrest 110, its left and right sides are respectively defined by the left lateral plate 130 and the right lateral plate 140, and its front side is defined by the front baffle 150. An opening is formed above the seating space 160 for a child to enter, exit, and be placed. In other embodiments, each panel of the main frame 100 can also be provided with an inner supporting layer (such as a rigid sheet or semi-rigid frame) to improve structural strength and overall support rigidity.

In an embodiment of the present disclosure, the various panels of the main frame 100 are fixedly connected using a stitching process. Specifically, the backrest 110 is fixedly connected to the adjacent sides of the left lateral plate 130 and the right lateral plate 140, the left lateral plate 130 to the adjacent side of the front baffle 150, and the right lateral plate 140 to the adjacent side of the front baffle 150, all through stitching. The stitching lines extend along the adjacent edges of each panel, ensuring connection strength and structural stability, so that the panels form a stable enclosed structure, reliably defining the seating space 160 and providing safe seating support for children. Moreover, the backrest 110, seat plate 120, the left lateral plate 130, the right lateral plate 140 and the front baffle 150 of the main frame 100 are all soft-covered plate members, and adjacent panels are connected at their adjacent edges via the stitching process to form flexible connecting parts, thereby allowing each panel to be relatively folded for storage.

Figure 8:
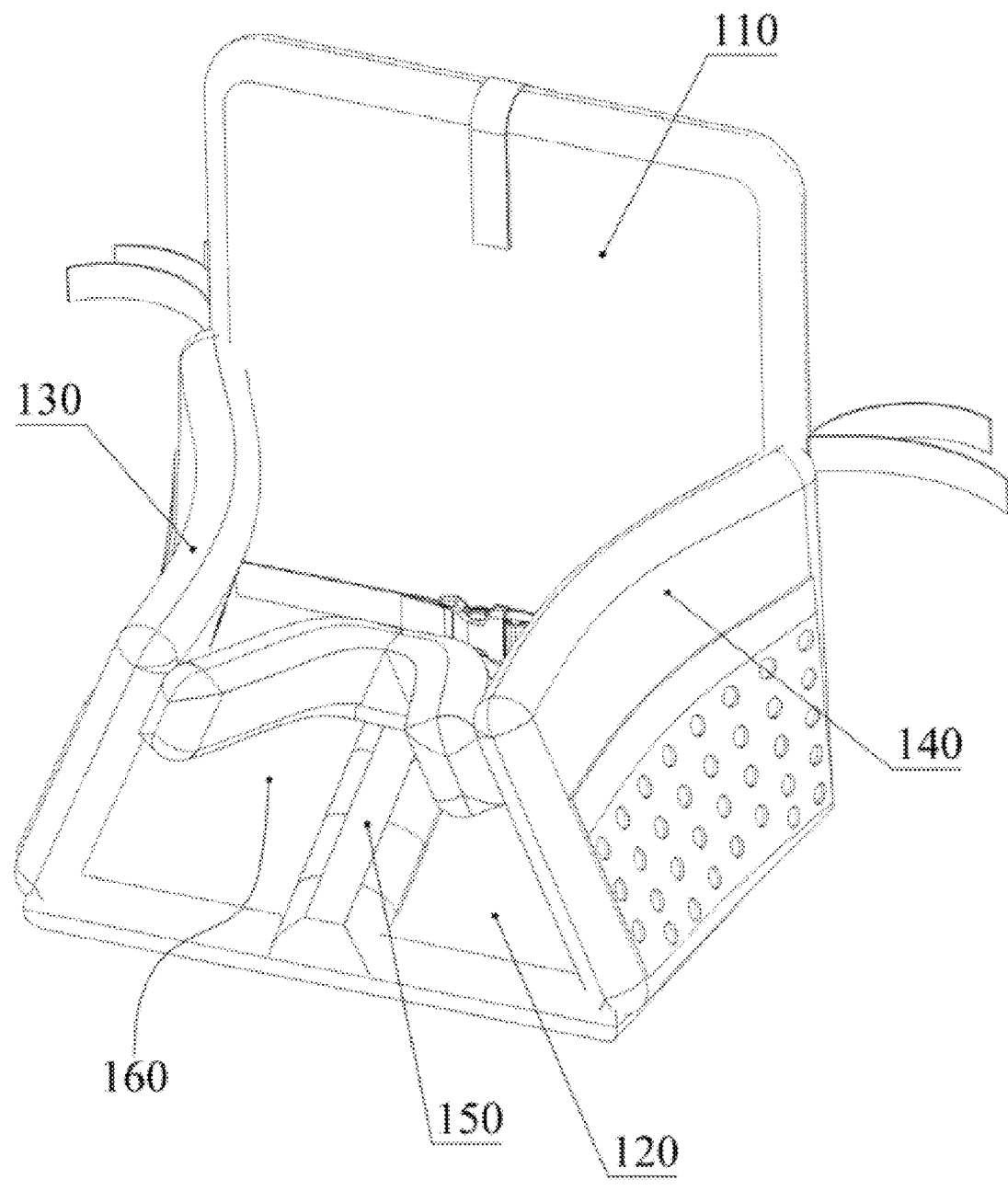
FIG. 8 is a perspective view of the first step of the main frame transitioning from the unfolded state to the folded state in the embodiment of FIG. 1.
Figure 9:
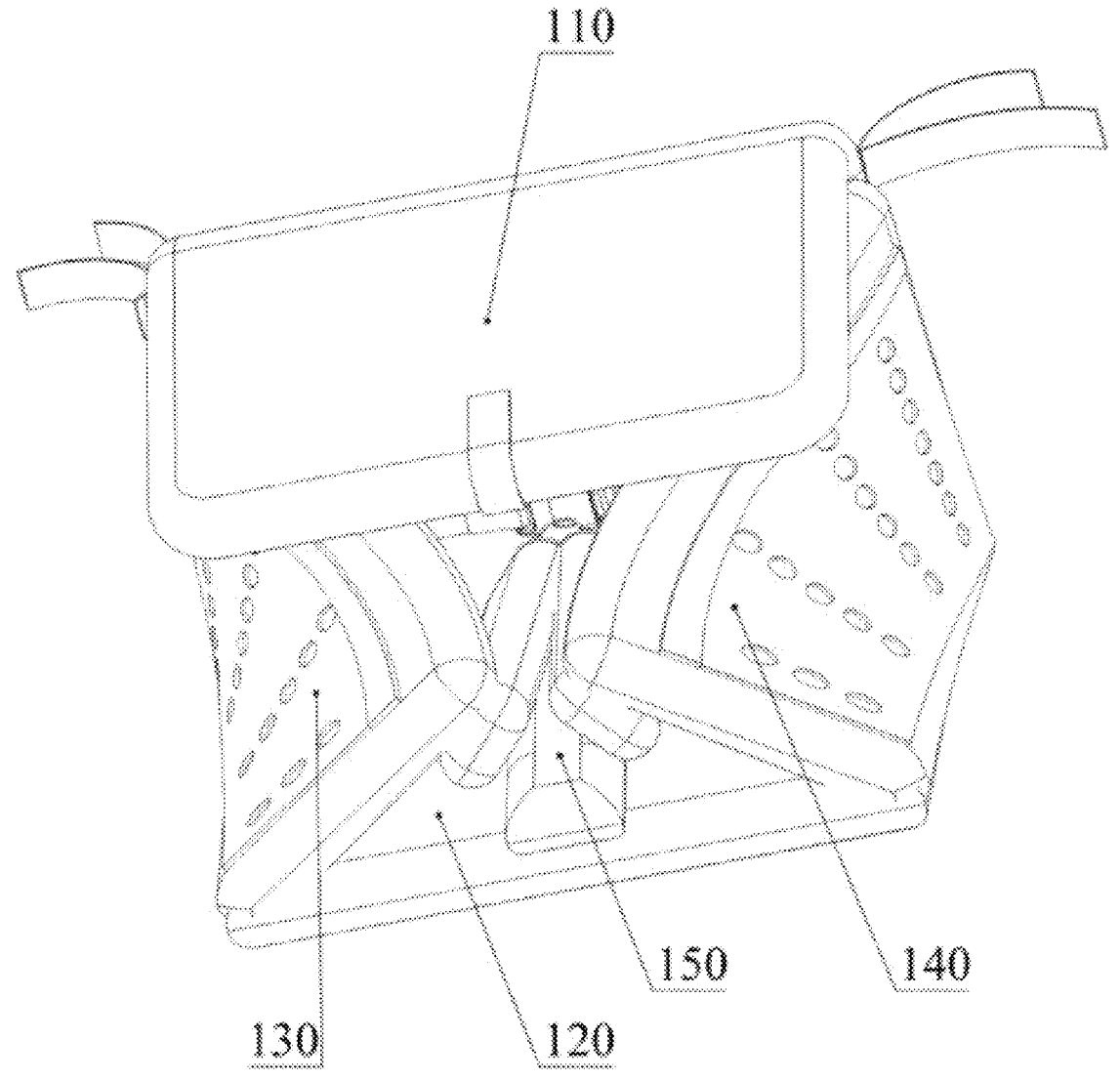
FIG. 9 is a perspective view of the second step of the main frame transitioning from the unfolded state to the folded state in the embodiment of FIG. 8.
Figure 10:
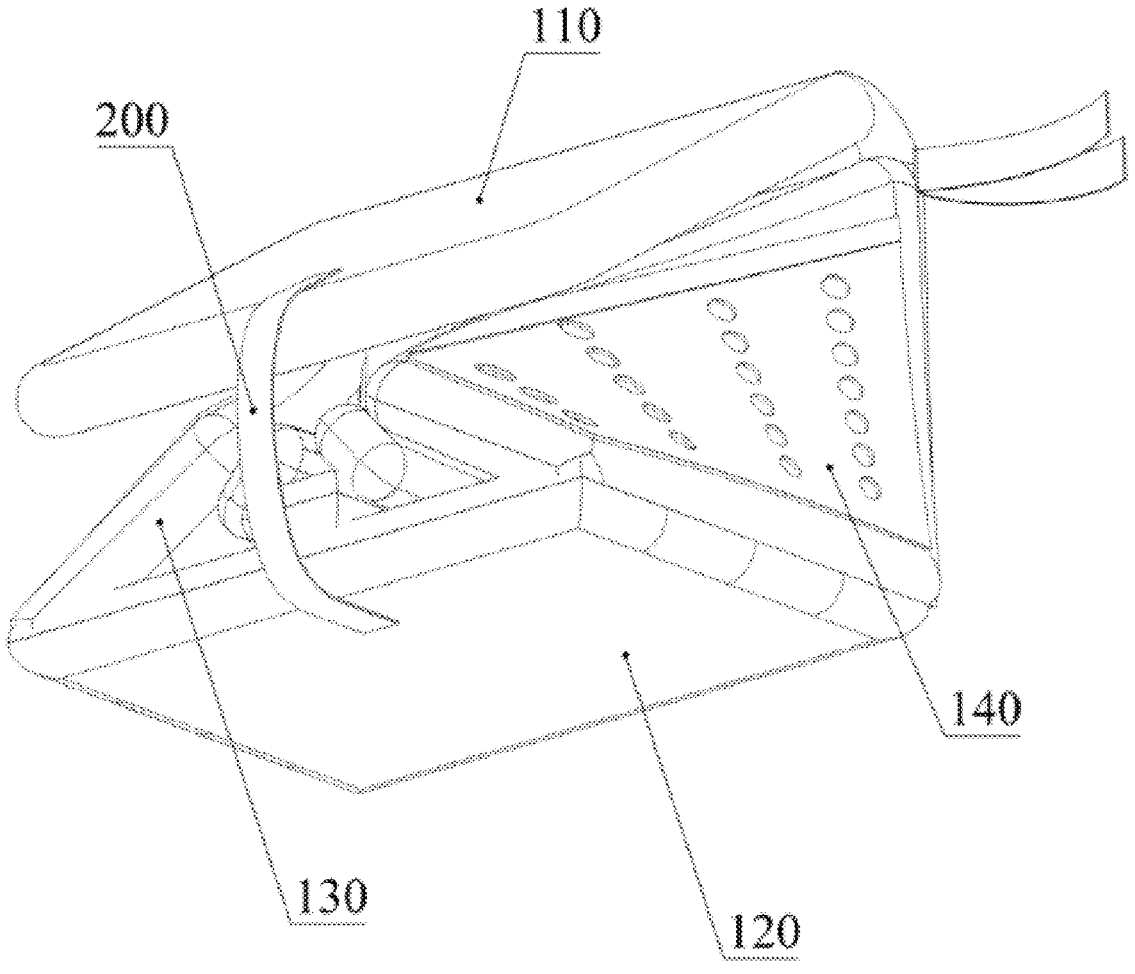
FIG. 10 is a perspective view of the third step of the main frame transitioning from the unfolded state to the folded state in the embodiment of FIG. 9.

As shown in FIGS. 8, 9, and 10, in the present disclosure, the user can operate to fold the child seat assembly by following the three-step method below: first, fold the left lateral plate 130 and the right lateral plate 140 inward toward the seating space 160 along their connections with the seat plate 120, and fold the front baffle 150 back toward the seat plate 120, thereby closing the seating space 160 and forming a stacked layer; then, fold the backrest 110 toward the seat plate 120 along its connection with the seat plate 120 to cover the stacked layer, so that the main frame 100 is gathered into a flat, stacked form; after folding is completed, the user can use at least one connecting belt in the connecting assembly 200 to wrap around the folded main frame 100 and lock it, thereby keeping the main frame 100 in the folded state. By circumferentially tightening and positionally fixing the folded main frame 100 through the connecting assembly 200, rebound expansion of the backrest 110, the left lateral plate 130, the right lateral plate 140 and the front baffle 150 during carrying or transportation can be effectively suppressed, preventing the folded state from becoming loose. The folded child seat assembly as a whole presents a neat, flat bag-like structure, facilitating single-handed carrying, placement into backpacks/luggage, and reducing occupied space, thereby enhancing the convenience of storage and use.

In other embodiments (not shown), to facilitate cleaning and maintenance and enhance product hygiene, the portable child seat assembly can be designed with an easily removable and washable structure. Specifically, the soft covering structures of the backrest 110, seat plate 120, the left lateral plate 130, the right lateral plate 140 and the front baffle 150 of the main frame 100 can be made detachable. For example, hidden zipper openings or VELCRO® (hook and loop fastener) opening edges can be provided on the outer covers of each plate, allowing users to remove the entire outer cover or take out the internal cushioning filling layer for separate washing, drying, or replacement. The outer covering layer is preferably made of durable fabric that is machine-washable and quick-drying. Furthermore, to better address potential stains or liquid spills during outdoor use, a removable waterproof liner can be added inside the covering layer of the seat plate 120, or snap buttons or adhesive positions for securing disposable hygiene pads can be set in the seating space 160 corresponding to the child's hip and back areas. These designs significantly improve the product's long-term hygiene, maintenance convenience, and user experience.

Please also refer to FIGS. 2, 3, 4, 12, 13, and 14. The connecting assembly 200 is used to detachably mount the main frame 100 onto an external support body, adapting to different usage scenarios such as shopping carts, swing devices, and independent seats. Specifically, the connecting assembly 200 includes a first connecting assembly 210, a second connecting assembly 220, and a third connecting assembly 230. Among these, the first connecting assembly 210 is preferably located at the top area of the backrest 110. The first connecting assembly 210 includes a first connecting belt 211, with one end of the first connecting belt 211 fixedly connected to the backrest 110 and the other end being a free end that can be wound around; the first connecting belt 211 is preferably structured as a VELCRO® (hook and loop fastener) strap, with its opposing surfaces provided with matching hook and loop faces, enabling the first connecting belt 211 to be wound around an external rod or strap and then self-locked by reattaching, thereby providing positioning and restraint for the upper part of the main frame 100.

In other embodiments (not shown), besides using a VELCRO® (hook and loop fastener) strap structure, the first connecting assembly 210 may also adopt other forms of connecting belts to enhance adaptability to different external bearing structures. For example, the first connecting belt 211 can be replaced with a buckle strap, ladder buckle adjustment strap, elastic binding strap, or hook strap. These different types of connecting belts can better adapt to shopping cart handles, swing ropes, or seat backrest crossbars of varying diameters, shapes, or materials. The configuration of the first connecting assembly 210 can also be varied: it can be set as a single belt body, or as a double belt body to increase stability, or even arranged in a cross pattern to provide more balanced tension. Furthermore, to achieve a wider range of installation adaptability, the first connecting belt 211 can flexibly adjust its effective fixed length by adding extension straps, lengthening pieces, or adopting a multi-segment connectable design, thereby ensuring that the upper part of the main frame 100 obtains stable positioning and limiting in various scenarios.

The second connecting assembly 220 is preferably arranged on both rear side areas of the main frame 100. The second connecting assembly 220 further includes a second left connecting assembly 221 and a second right connecting assembly 222, wherein the second left connecting assembly 221 is arranged on the left lateral plate 130 and adjacent to the side area of the backrest 110, and the second right connecting assembly 222 is arranged on the right lateral plate 140 and adjacent to the side area of the backrest 110. The structures of the second left connecting assembly 221 and the second right connecting assembly 222 are preferably the same, both preferably being two-segment hook-and-loop structures. The second left connecting assembly 221 includes a first sub-belt 221a and a second sub-belt 221b, wherein one end of the first sub-belt 221a is fixedly connected to the left lateral plate 130 by stitching, and the other end is a free end that can be wound; one end of the second sub-belt 221b is fixedly connected to the left lateral plate 130 by stitching, and the other end is a free end that can be wound. The free ends of the first sub-belt 221a and the second sub-belt 221b are respectively provided with the loop side and hook side of the hook-and-loop fastener, enabling them to adhere and lock together after being wound around an external rod or strap, thereby forming a closed encircling connection. Preferably, the first sub-belt 221a and the second sub-belt 221b are in a separated state when not wound; during use, they wrap around from both sides of the external carrier respectively and overlap and adhere on the outer side to achieve fixation. The second right connecting assembly 222 includes a cooperating third sub-belt 222a and a fourth sub-belt 222b. One end of the third sub-belt 222a and one end of the fourth sub-belt 222b are respectively fixedly connected to the right lateral plate 140, and the other free ends of both achieve closed fixation through the adhesion of the hook side and loop side. During use, the third sub-belt 222a and the fourth sub-belt 222b can be wound around the right-side rod, side frame, or suspension rope of the external carrier respectively and adhered and locked on the outer side, cooperating with the second left connecting assembly 221 to provide lateral restraint at the left and right ends of the main frame 100 in the transverse direction X and enhance anti-rollover capability.

The third connecting assembly 230 is preferably disposed in the front area of the main frame 100. The third connecting assembly 230 further includes a third left connecting assembly 231 and a third right connecting assembly 232, both of which are disposed on the transverse baffle segment 151 of the front baffle 150 and spaced apart along the axial direction of the transverse baffle segment 151. The third left connecting assembly 231 and the third right connecting assembly 232 are preferably identical VELCRO® (hook and loop fastener) strap structures, each including a third left connecting belt 2311 and a third right connecting belt 2321, respectively. Both the third left connecting belt 2311 and the third right connecting belt 2321 are configured with one end fixedly connected to the front baffle 150 and the other end as a wrappable free end. The third left connecting belt 2311 and the third right connecting belt 2321 are both equipped with matching VELCRO® (hook and loop fastener) hook and loop surfaces. During use, the free ends of the third left connecting belt 2311 and the third right connecting belt 2321 can be wrapped around corresponding front rods, frames, or support structures of an external bearing structure, and then self-locked by reattaching the hook and loop surfaces, thereby effectively securing and restraining the front area of the main frame 100 to prevent the seat from sliding or shifting forward during use.

In other embodiments (not shown), the third connecting assembly 230 can be adaptively designed according to the specific form of the external bearing structure. The third connecting assembly 230 can be configured as one or a plurality of sets of distributed straps; for example, three sets of spaced connecting belts can be arranged on the transverse baffle segment 151 of the front baffle 150 to better adapt to complex structures of different shopping cart front crossbars or seat frames. The specific forms of the third left connecting belt 2311 and the third right connecting belt 2321 are not limited to VELCRO® (hook and loop fastener) straps; elastic VELCRO® (hook and loop fastener) bandages can also be used to accommodate slightly elastic rods, or buckle straps and cinching straps can be employed for quick locking and release. To further enhance stability after fixation, anti-slip friction pads or limit rings can be added to the inner sides of the third left connecting belt 2311 and the third right connecting belt 2321 (i.e., the side in contact with the external bearing structure) to prevent the main frame 100 from tilting forward or sliding down under force during use.

Figure 4:
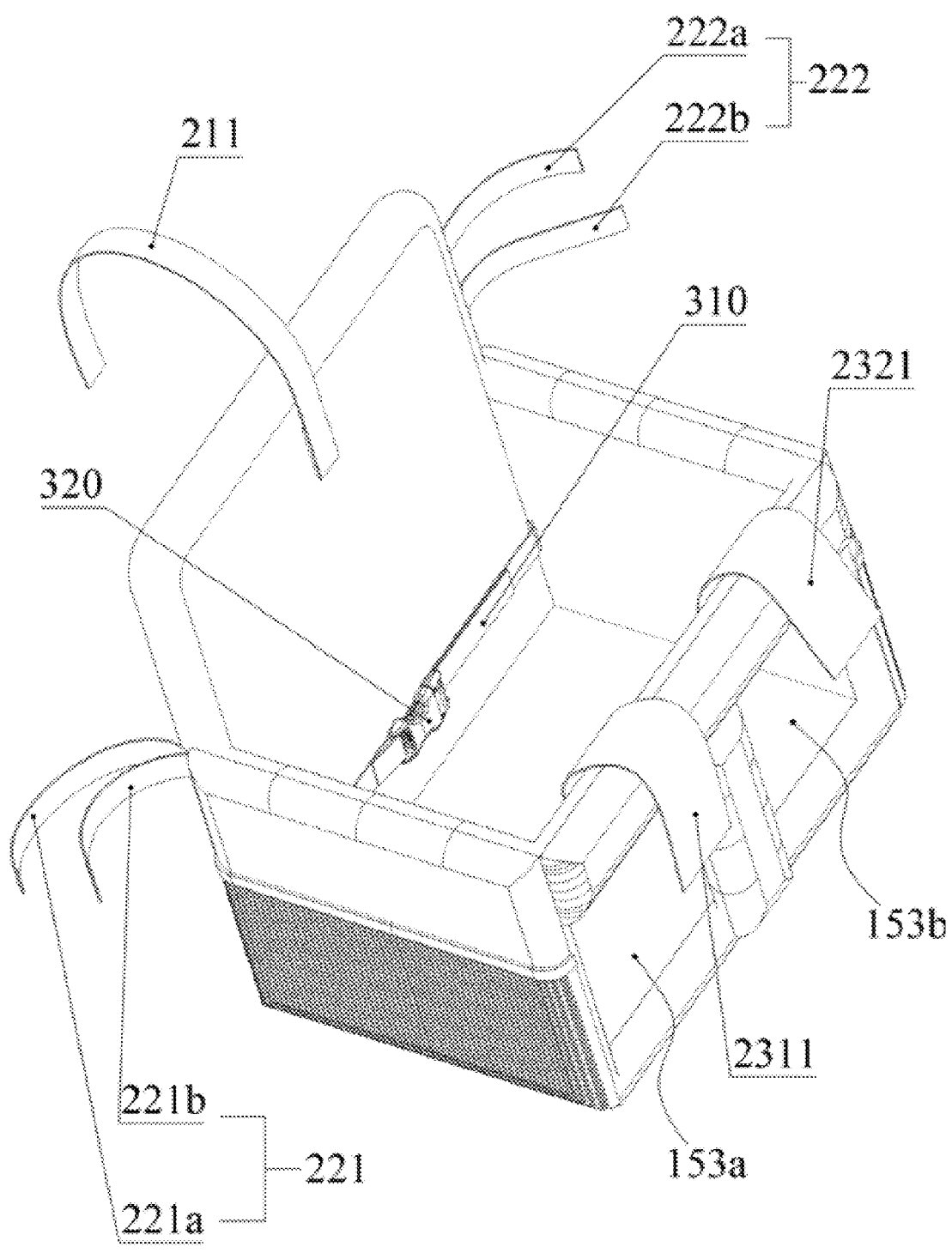
FIG. 4 is a front view of the embodiment shown in FIG. 1.
Figure 5:
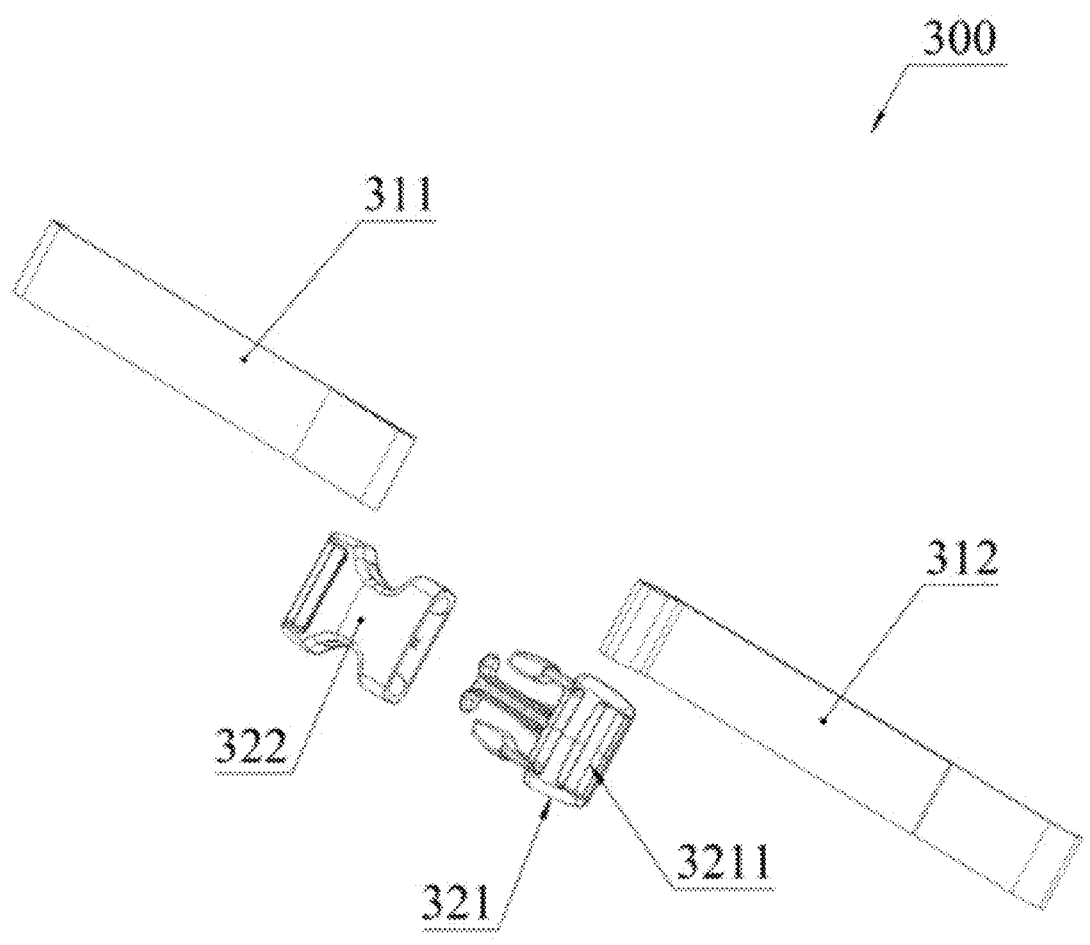
FIG. 5 is another perspective view of the embodiment shown in FIG. 1.

As shown in FIGS. 1, 4, and 5, the protective assembly 300 is arranged within the seating space 160 formed by the main frame 100. It is configured as an adjustable buckle-type safety belt structure extending along the transverse direction X, including a connecting belt 310 and a buckle assembly 320. The connecting belt 310 includes a fixed segment 311 and an adjustable segment 312, while the buckle assembly 320 includes a male buckle 321 and a female buckle 322. Here, one end of the fixed segment 311 is fixedly connected via stitching to one side edge of the backrest 110, and the other end is fixedly connected to the female buckle 322. One end of the adjustable segment 312 is fixedly connected via stitching to the other side edge of the backrest 110, and the other end is adjustably connected to the male buckle 321. The male buckle 321 integrates an adjustment buckle 3211, allowing the adjustable segment 312, when secured, to flexibly change its effective exposed length, thereby adapting to the frontal space of children of different heights and body types. In practical use, after a child sits in the seating space 160 and adjusts to a comfortable posture, one only needs to pull the adjustable segment 312 toward the side of the female buckle 322, align the male buckle 321 with the female buckle 322, and press to buckle them together. The connecting belt 310 then forms a transverse restraining belt in front of the child, precisely covering the area from the waist to the chest-effectively restricting significant forward or lateral body displacement, while not obstructing the leg opening 153 of the front baffle 150, thus not affecting the natural extension of the child's legs. To lift the child out, pressing the male buckle 321 to disengage it from the female buckle allows for quick separation of the male buckle 321 and female buckle 322, offering convenient operation without the need for additional tools.

Figure 6:
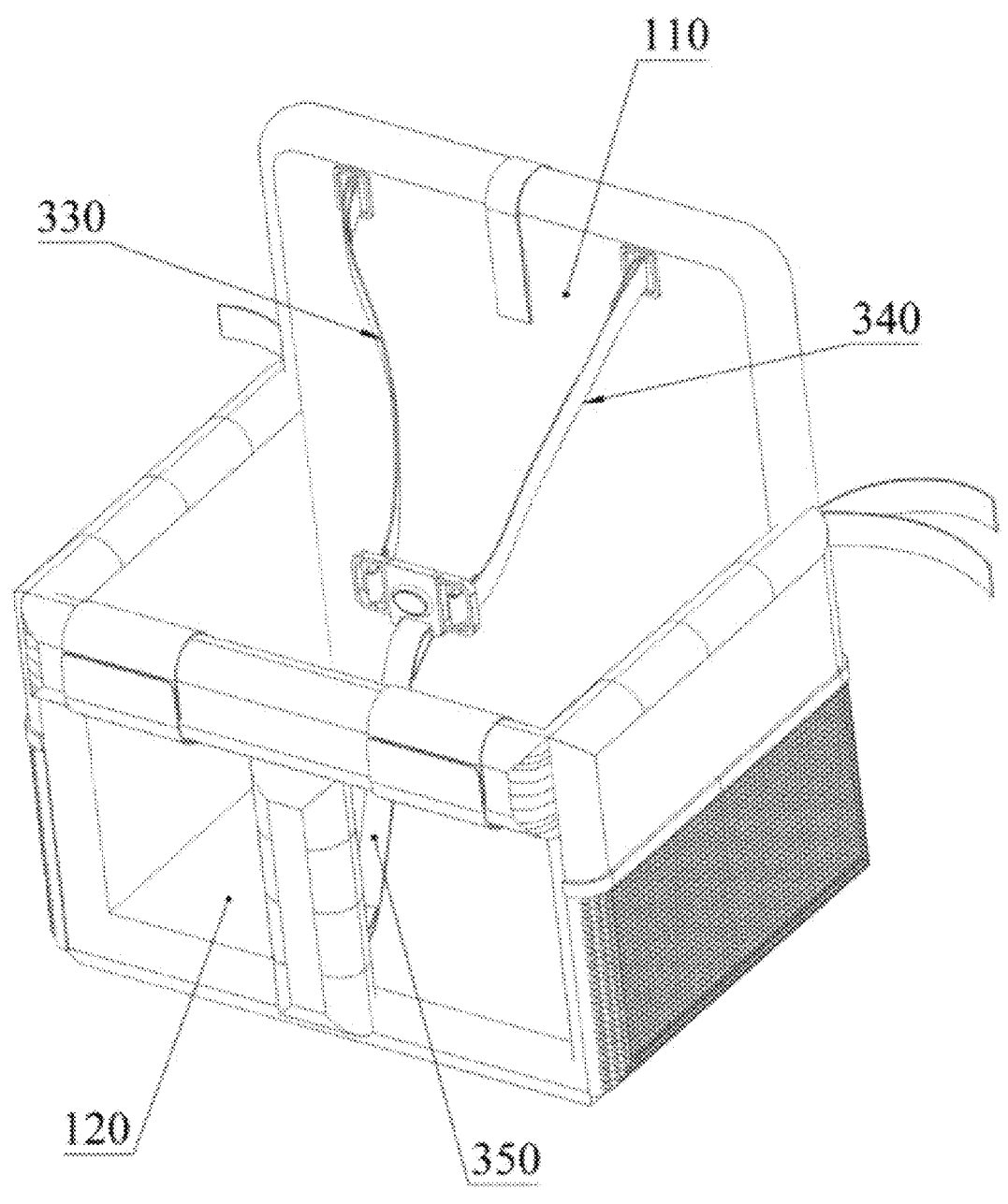
FIG. 6 is a perspective view of another embodiment of the protective assembly provided by the present disclosure.

As shown in FIG. 6, in another embodiment of the present disclosure, the protective assembly 300 can be configured as a three-point seat belt structure to further ensure restraint protection. Specifically, the protective assembly 300 includes a first restraining belt 330, a second restraining belt 340, a third restraining belt 350, and a buckle assembly 320 (including a male buckle 321 and a female buckle 322). Among them, the first restraining belt 330 and the second restraining belt 340 can be respectively set as shoulder belts and fixed to the upper area of the backrest 110, while the third restraining belt 350 can be set as a lap belt and fixed to the front area of the seat plate 120 (for example, adjacent to the side of the front baffle 150). Moreover, the connection methods of the first restraining belt 330, the second restraining belt 340, and the third restraining belt 350 to the buckle assembly 320 can all fully adopt the connection method of the aforementioned connecting belt 310 and the buckle assembly 320. During use, after a child sits in the seating space 160, the first restraining belt 330 and the second restraining belt 340 are respectively draped over the child's shoulders and guided downward to the front of the chest and abdomen, then the third restraining belt 350 is pulled upward from between the child's legs, aligning and fastening the male buckle 321 and the female buckle 322 to form a three-point restraint. This creates a combined restriction at the shoulders and crotch, effectively preventing the child from pitching forward or sliding down, and enhancing the convenience of quick seating and quick unlocking.

Figure 7:
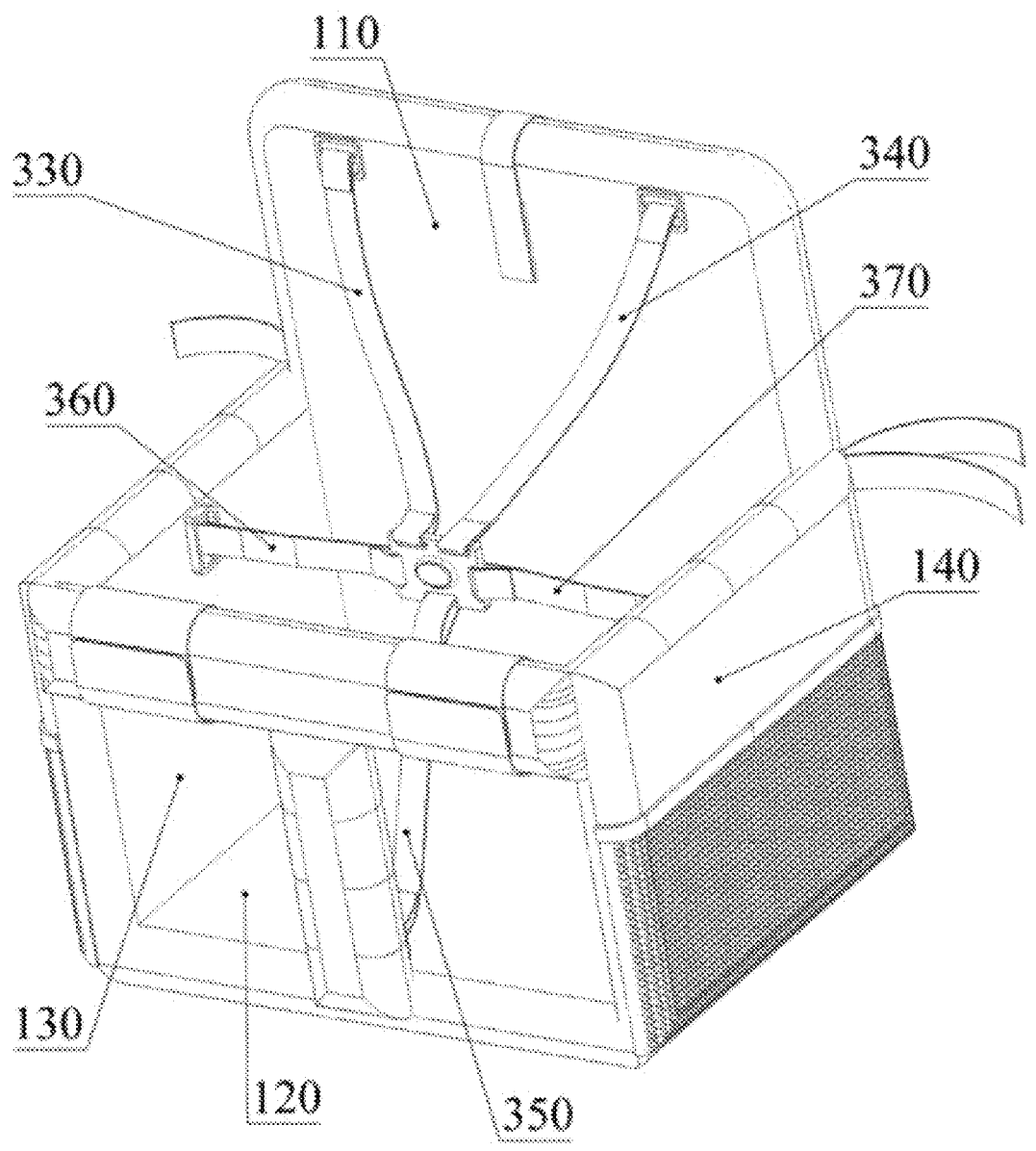
FIG. 7 is a perspective view of another embodiment of the protective assembly provided by the present disclosure.

In other embodiments, as shown in FIG. 7, the protective assembly 300 can also be configured as a five-point harness seat belt structure to further enhance the multi-dimensional restraint capability for a child's torso. In this implementation, the protective assembly 300 includes a first restraining belt 330, a second restraining belt 340, a third restraining belt 350, a fourth restraining belt 360, a fifth restraining belt 370, and a buckle assembly 320 (including a male buckle 321 and a female buckle 322). Here, the first restraining belt 330 and the second restraining belt 340 can be respectively configured as shoulder straps and fixed to the upper area of the backrest 110; the fourth restraining belt 360 and the fifth restraining belt 370 can be respectively configured as waist belts and fixed to the inner side of the left lateral plate 130 and the right lateral plate 140 or to areas adjacent to the seat plate 120; the third restraining belt 350 can be configured as a cross belt and fixed to the front area of the seat plate 120. The connection method between each restraining belt and the buckle assembly 320 can fully adopt the connection method of the aforementioned connecting belt 310 and the buckle assembly 320. Moreover, in this implementation, the buckle assembly 320 can include one female buckle 322 and a plurality of male buckles 321 that engage with it, to achieve centralized fastening of a plurality of belt ends. During use, after the child sits in the seating space 160, first place the first restraining belt 330 and the second restraining belt 340 over the child's shoulders, wrap the fourth restraining belt 360 and the fifth restraining belt 370 around both sides of the child's waist and hips, then bring the third restraining belt 350 upward from between the legs, and fasten and lock each male buckle 321 with the female buckle 322. This forms a five-point restraint layout at both shoulders, both waist sides, and the crotch, which can more comprehensively restrain the child's forward leaning, lateral shifting, and sliding down in dynamic scenarios such as swinging and bumping, thereby improving seating stability and safety.

Figure 11:
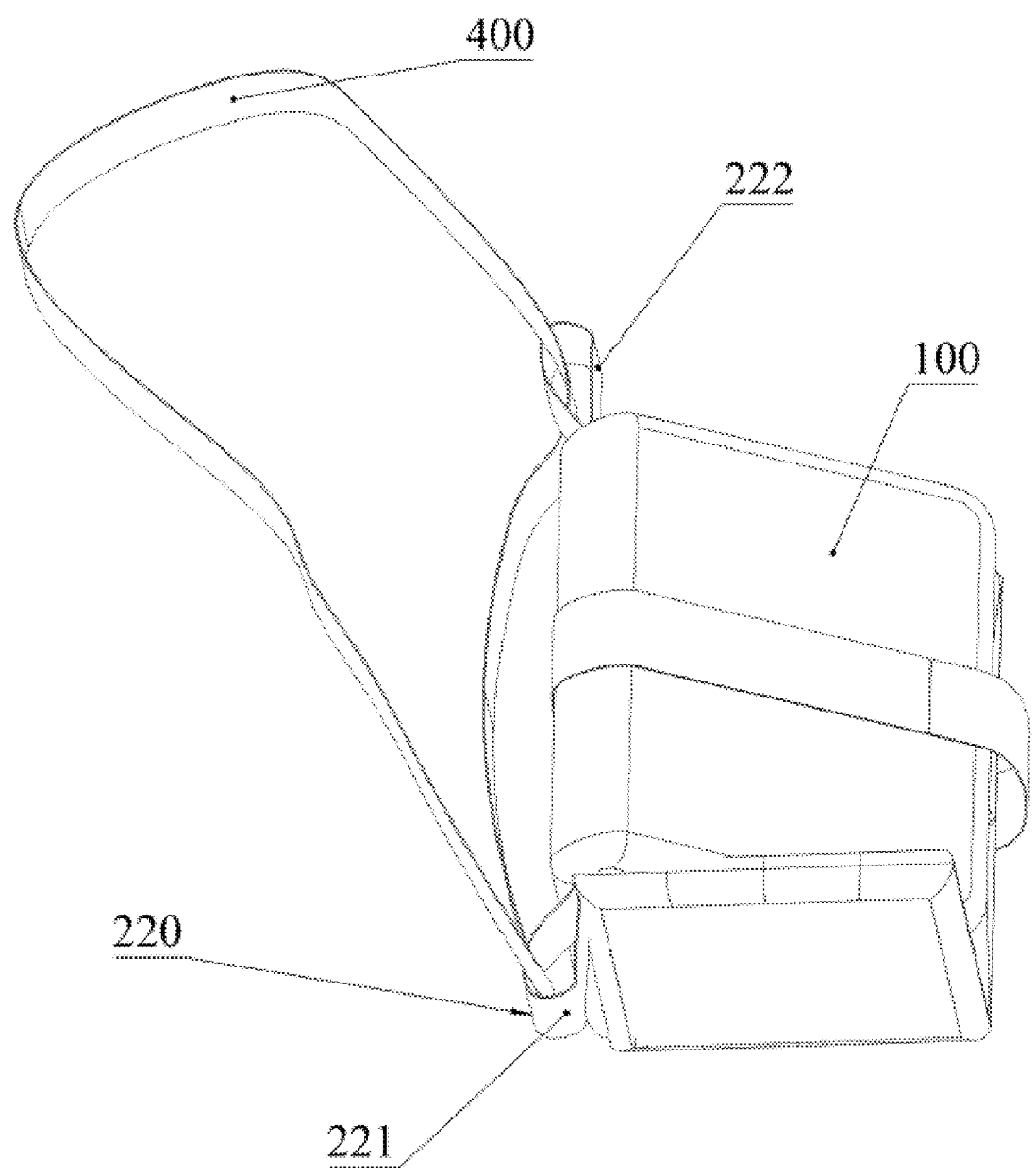
FIG. 11 is a perspective view of the cross belt installed after the main frame is folded in the embodiment of FIG. 10.

As shown in FIG. 11, in the present disclosure, after the main frame 100 is folded, a cross belt 400 is further provided for user convenience in carrying. Specifically, an annular belt body is threaded through the belt-passing portion formed at the second connecting assembly 220 (the second left connecting assembly 221 and the second right connecting assembly 222), so that the belt body is fixedly connected to the folded main frame 100, serving as a cross belt 400 for the user to carry by hand or over the shoulder. This facilitates hand-carrying or shoulder-carrying in scenarios such as shopping or travel, further enhancing the product's portable storage feature.

Figure 12:
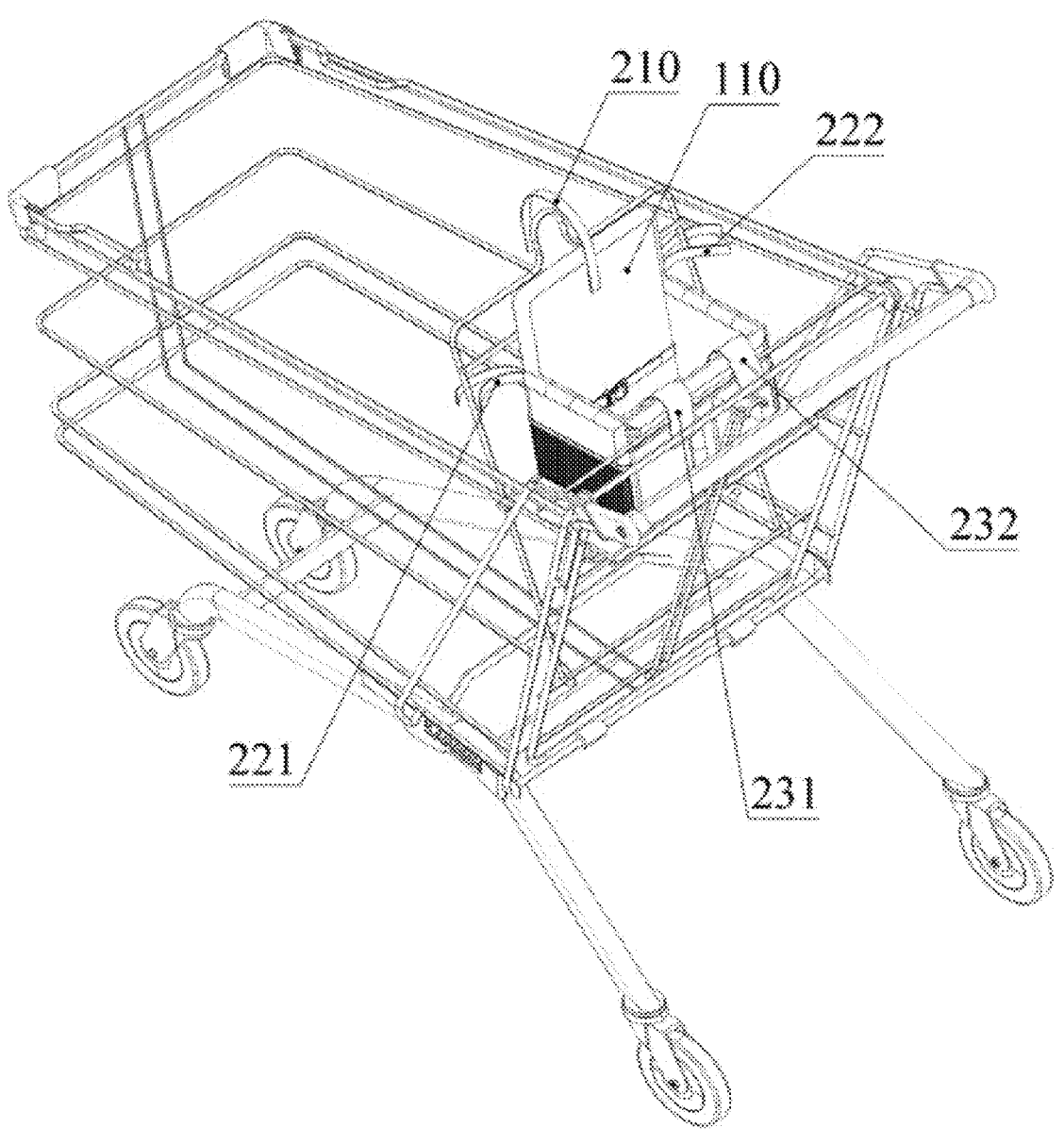
FIG. 12 is a usage state diagram of the embodiment shown in FIG. 1 in a shopping cart seat scenario.

The present disclosure provides a portable child seat assembly suitable for various scenarios, which can be flexibly switched to shopping carts, swings, children's stools, and other scenarios by leveraging the multi-dimensional adaptation structure of the connecting assembly 200. For example, as shown in FIG. 12, in the shopping cart child seat scenario, most shopping carts come with built-in child seats, but their materials are often hard plastic or metal frames, which not only feel cold and lack cushioning, failing to provide comfortable support for the child's hips and back, but also have sharp edges and corners without soft protection, making the occupant prone to bumps and injuries. The portable child seat assembly of the present disclosure effectively addresses this pain point. Users can place the portable child seat assembly on the original seat of the shopping cart and achieve stable adaptation through the multi-dimensional fixation of the connecting assembly 200: first, wrap the first connecting assembly 210 at the top of the backrest 110 around the rear upper handrail rod of the shopping cart, tighten and straighten it, then self-lock it by reattaching the hook-and-loop fastener, completing the upper positioning of the seat; next, wrap the sub-belts of the second left connecting assembly 221 and the second right connecting assembly 222 of the second connecting assembly 220 around the left and right side frames of the shopping cart, respectively, forming an embracing fixation by attaching the hook-and-loop fasteners at the free ends of the sub-belts, restricting left-right displacement of the seat; finally, use the third left connecting assembly 231 and the third right connecting assembly 232 of the third connecting assembly 230 to wrap around the horizontal rod at the front of the shopping cart and reattach for fixation, securing the front of the seat to prevent sliding.

After fixation is completed, the composite structure of the main frame 100—"rigid support layer+cushioning filling layer+fabric covering layer"—completely replaces the hard contact surface of the original shopping cart seat. The cushioning filling layer provides soft support for the child's hips and back, avoiding coldness and discomfort; simultaneously, the soft edging of the enclosing frame and the buckle-type safety belt of the protective assembly 300 not only cover the sharp edges and corners of the original shopping cart seat but also form dual protection, reducing the risk of bumps and accidental detachment; moreover, the storage assembly 170 on the outer walls of the left lateral plate 130 and the right lateral plate 140 can directly hold items such as wet wipes and bottles, solving the problem of having no space to store personal belongings while shopping.

Figure 13:
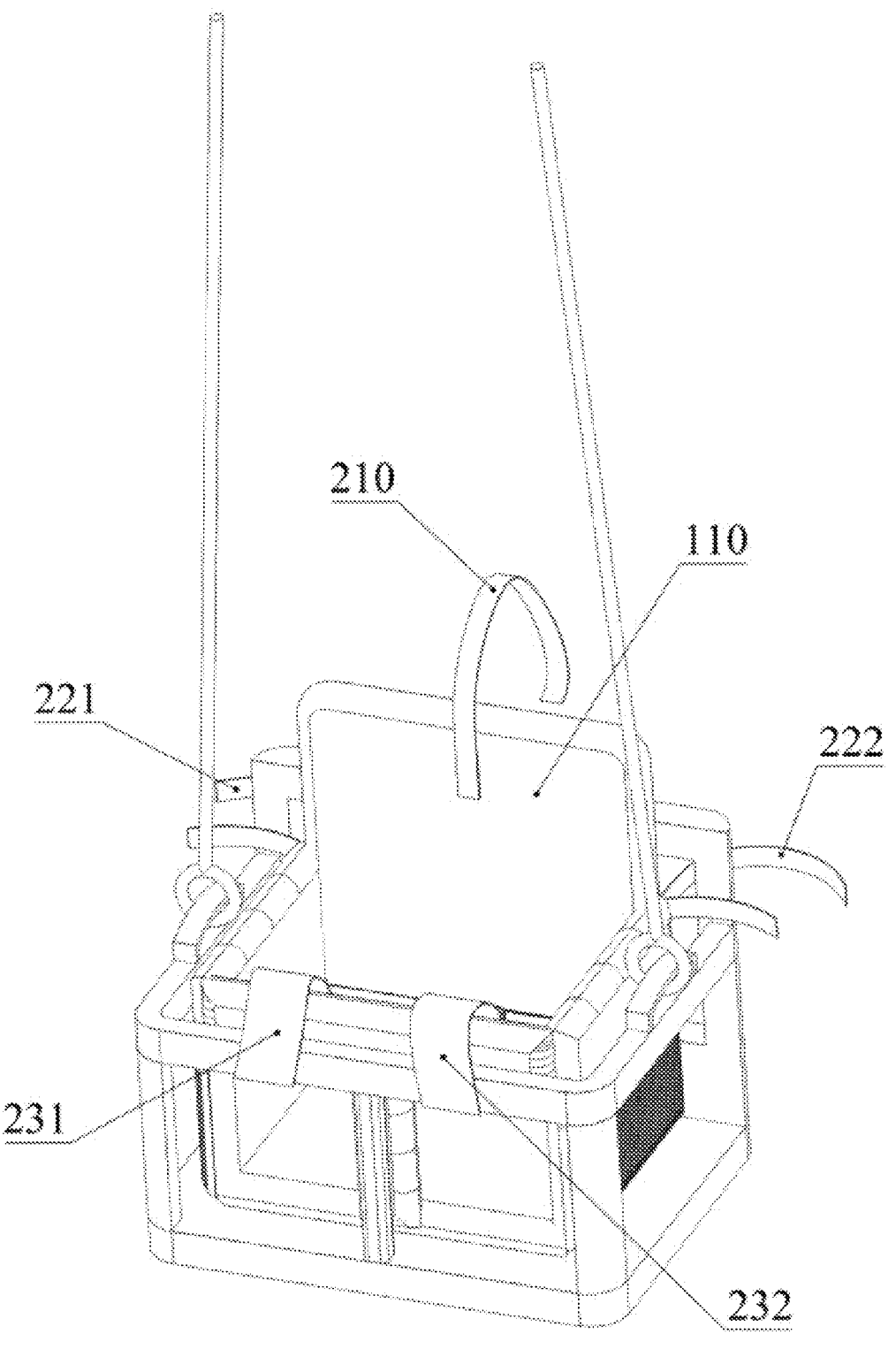
FIG. 13 is a usage state diagram of the embodiment shown in FIG. 1 in a swing seat scenario.

As shown in FIG. 13, in outdoor or indoor children's swing scenarios, traditional swing seats often feature a simple net rope combined with a rigid seat plate structure, lacking comfort and causing children to tire easily after prolonged sitting. The portable child seat assembly of the present disclosure can adapt to this scenario: the soft cushioning layer of the main frame 100 mitigates the impact force from swing motion, providing a more comfortable seating experience; the multi-dimensional VELCRO® (hook and loop fastener) strap of the connecting assembly 200 can adapt to various suspension devices (such as swings) for quick fixation, while the enclosed frame, combined with the dual protection of the protective assembly 300, prevents children from slipping sideways during swing motion, enhancing swing safety.

Figure 14:
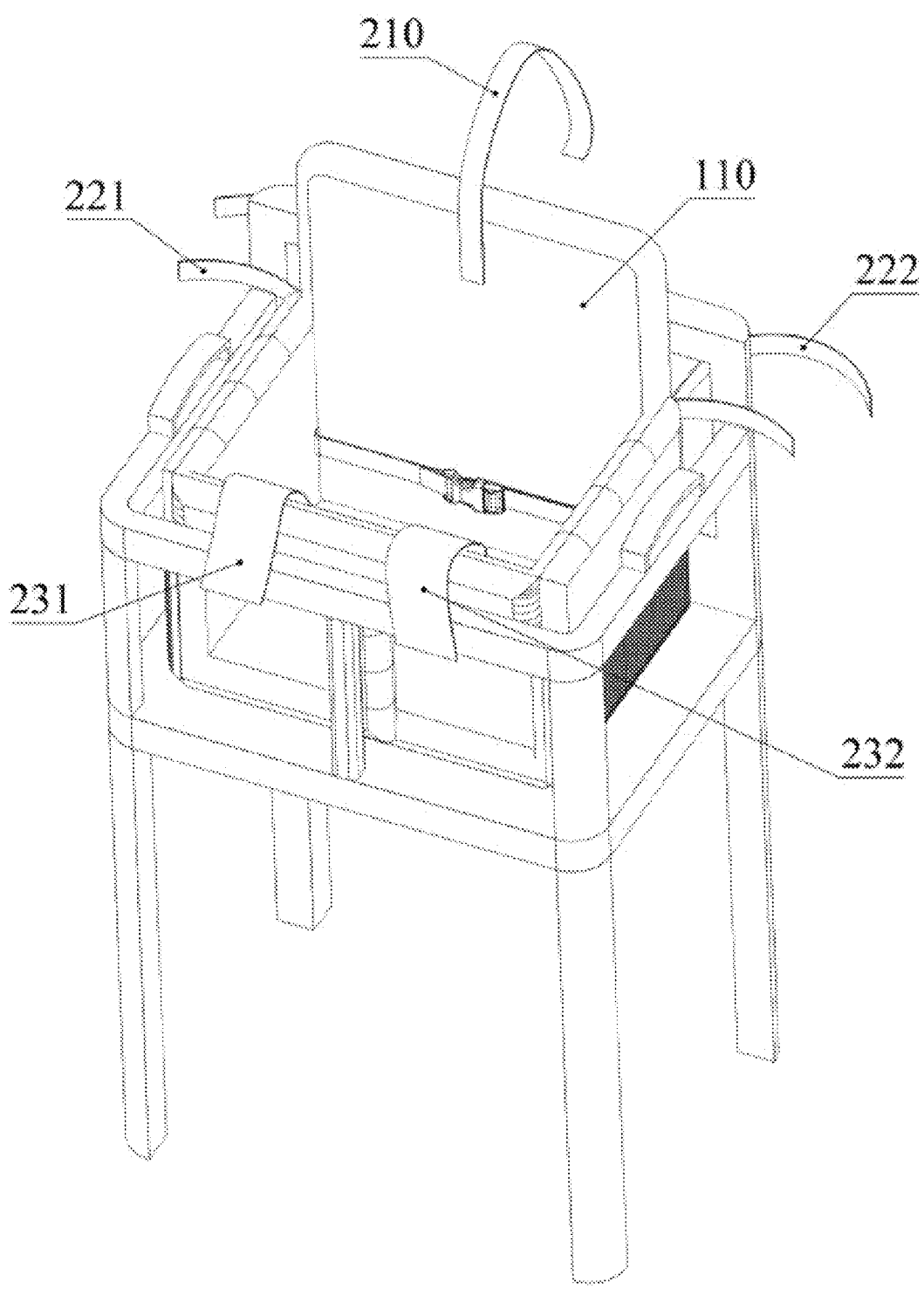
FIG. 14 is a usage state diagram of the embodiment shown in FIG. 1 in a child stool scenario.

As shown in FIG. 14, in the context of children's stools, most stools can fulfill the basic seating and load-bearing function, but their rigid board structure similarly lacks comfort. The portable child seat assembly of the present disclosure can be installed onto the seating space of a children's stool, while the enclosed seating space 160 formed by the main frame 100 and the protective assembly 300 constitute a dual-protection structure, effectively limiting the child's sitting posture and reducing the risk of tipping over; additionally, the storage assembly 170 allows for the containment of carried items, enabling the stool to serve both seating and storage functions, thereby expanding the practicality of its usage scenarios.

In summary, the present disclosure achieves the following technical effects: through the enclosed layout of the backrest 110, the seat plate 120, the left lateral plate 130, the right lateral plate 140 and the front baffle 150 of the main frame 100, combined with detachable connections or stitching fixation at the edges of each panel, a seating space 160 conforming to a child's body shape is collectively defined, with its soft-covered composite structure providing comfortable cushioning and safe envelopment; utilizing the multi-point VELCRO® (hook and loop fastener) strap structure of the connecting assembly 200, it can be wound around and secured to different rods and frames of an external carrier, enabling quick, stable, and detachable installation of the main frame 100 in various scenarios such as shopping carts, swings, and seats; through the T-shaped structure of the front baffle 150 and its connection with the lateral plates and seat plate, an effective forward limit is formed while naturally defining a leg opening 153 for leg extension, balancing protection and freedom of movement; relying on the adjustable buckle-type or cross-type safety belt structure of the protective assembly 300, a restraining belt covering the child's waist-abdomen or chest-abdomen can be conveniently formed, creating dual protection with the enclosed frame to effectively restrict child displacement and reduce fall risks; simultaneously, the storage assembly 170 set on the outer walls of the lateral plates directly provides storage space for carried items, enhancing convenience of use; in the foldable embodiment, through the separation of VELCRO® (hook and loop fastener) between panels and panel folding, the whole can be collapsed into a flat form, and the connecting belt of the protective assembly 300 can also serve as a handle, significantly improving convenience for storage and carrying. Ultimately, through the synergistic effects of "comfortable enclosed structure, multi-scenario quick connection, adjustable protective restraint, and convenient storage," the technical problems of traditional public children's seats—such as being hard and uncomfortable, having poor safety, single functionality, inconvenient installation and fixation, and lacking portability—are effectively solved, balancing child seating comfort, safety, scenario adaptability, and convenience for parental use.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A portable child seat assembly, comprising:
a main frame, comprising a backrest, a seat plate, a left lateral plate, a right lateral plate and a front baffle with soft covering layers,
wherein the backrest is connected to the seat plate, the left lateral plate and the right lateral plate, the front baffle is connected to the seat plate, the left lateral plate and the right lateral plate, which together enclose a seating space for accommodating a child; and
the front baffle is configured to provide support at a front side of the seat plate and define at least one leg opening for the child's legs to extend through;
a connecting assembly, comprising a plurality of connecting belts arranged at separate positions on the main frame for detachably fixing to an external bearing structure, wherein the connecting assembly comprises a first connecting assembly disposed on the backrest, a second connecting assembly disposed on the left lateral plate and the right lateral plate adjacent to the backrest, and a third connecting assembly disposed on the front baffle; and a protective assembly, comprising an adjustable safety belt fixed at both ends to the backrest, configured to span the seating space to restrain the child therein.

2. The portable child seat assembly according to claim 1, wherein the front baffle comprises a transverse baffle segment and a longitudinal baffle segment, the longitudinal baffle segment configured to be fixedly connected to the transverse baffle segment and extending vertically downward from a middle portion of the transverse baffle segment.

3. The portable child seat assembly according to claim 2, wherein the at least one leg opening comprises a first leg opening on the left and a second leg opening on the right, separated by the longitudinal baffle segment.

4. The portable child seat assembly according to claim 1, wherein the backrest is fixedly connected to the seat plate, the left lateral plate and the right lateral plate by stitching, and the front baffle is fixedly connected to the seat plate, the left lateral plate and the right lateral plate by stitching.

5. The portable child seat assembly according to claim 4, wherein the backrest, the seat plate, the left lateral plate, the right lateral plate and the front baffle are all soft-covered plate members, and corresponding edges of adjacent plate members are formed into flexible connecting parts by stitching, to allow the backrest to fold relative to the seat plate, the left lateral plate and the right lateral plate to fold relative to the seat plate, and the front baffle to fold back relative to the seat plate, thereby enabling the main frame to transition between an unfolded state and a folded state.

6. The portable child seat assembly according to claim 1, wherein the first connecting assembly comprises a first connecting belt, with one end being fixed to a top of the backrest, and another end being a free end.

7. The portable child seat assembly according to claim 1, wherein the second connecting assembly comprises a second left connecting assembly disposed on the left lateral plate and a second right connecting assembly disposed on the right lateral plate.

8. The portable child seat assembly according to claim 7, wherein the second left connecting assembly comprises a first sub-belt and a second sub-belt that are mated to form an encircling connection, and the second right connecting assembly comprises a third sub-belt and a fourth sub-belt that are mated to form an encircling connection.

9. The portable child seat assembly according to claim 1, wherein the third connecting assembly comprises a third left connecting assembly disposed on a left side of the front baffle and a third right connecting assembly disposed on a right side of the front baffle; and the third left connecting assembly comprises a third left connecting belt, and the third right connecting assembly comprises a third right connecting belt.

10. The portable child seat assembly according to claim 1, wherein the plurality of connecting belts are hook and loop fastener straps.

11. The portable child seat assembly according to claim 1, wherein the protective assembly comprises a connecting belt and a buckle assembly that is mated with the connecting belt, the connecting belt comprises a fixed segment and an adjustable segment, and the buckle assembly is configured to connect the fixed segment and the adjustable segment.

12. The portable child seat assembly according to claim 11, wherein the buckle assembly comprises a male buckle and a female buckle; one end of the fixed segment is fixed to one side of the backrest, and another end of the fixed segment is fixedly connected to the female buckle; and one end of the adjustable segment is fixed to another side of the backrest, and another end of the adjustable segment is a free end connected to the male buckle.

13. The portable child seat assembly according to claim 12, wherein the male buckle is provided with an adjustment buckle, a free end of the adjustable segment passes through the adjustment buckle and is locked by the adjustment buckle to adjust an effective restraining length of the adjustable safety belt.

14. A portable child seat assembly, comprising:

a main frame, comprising a backrest, a seat plate, a left lateral plate, a right lateral plate and a front baffle with soft covering layers, wherein the backrest is connected to the seat plate, the left lateral plate and the right lateral plate, the front baffle is connected to the seat plate, the left lateral plate and the right lateral plate, which together enclose a seating space for accommodating a child; and the front baffle is configured to provide support at a front side of the seat plate and define at least one leg opening for the child's legs to extend through;

a connecting assembly, comprising a plurality of connecting belts arranged at separate positions on the main frame for detachably fixing to an external bearing structure;

a protective assembly, comprising an adjustable safety belt fixed at both ends to the backrest, configured to span the seating space to restrain the child therein, wherein the protective assembly is configured as a multi-point safety belt structure, comprising at least a first restraining belt, a second restraining belt, a third restraining belt and a buckle assembly; and wherein the first restraining belt and the second restraining belt are respectively configured as shoulder belts and fixed to an upper area of the backrest, the third restraining belt is configured as a cross belt and fixed to a front area of the seat plate; and free ends of the first restraining belt, the second restraining belt and the third restraining belt are respectively detachably fastened with the buckle assembly to form a restraining fixation for the child in front of the child's chest and abdomen.

15. The portable child seat assembly according to claim 5, further comprising a cross belt configured as an annular belt body, wherein the annular belt body forms a ring structure for carrying when the main frame is in the folded state.

16. The portable child seat assembly according to claim 1, further comprising a storage assembly disposed on an outer side of the left lateral plate and/or the right lateral plate, wherein the storage assembly comprises at least one receiving pocket for accommodating items.

17. The portable child seat assembly according to claim 1, wherein the soft covering layers comprise a cushioning filling layer and an outer covering layer covering the cushioning filling layer.

18. The portable child seat assembly according to claim 17, wherein the cushioning filling layer is selected from either a foam material or a cotton material, and the outer covering layer is selected from either fabric or a leather material.

19. The portable child seat assembly according to claim 18, wherein the soft covering layers further comprise an inner supporting layer disposed on an inner side of the cushioning filling layer, and the inner supporting layer is selected from either a rigid sheet or a semi-rigid frame.

* * * * *